Sept. 15, 1942.                R. A. HOORN ET AL                2,295,789
                                 FLUE CUTTING TOOL
                              Filed July 22, 1940              2 Sheets-Sheet 1
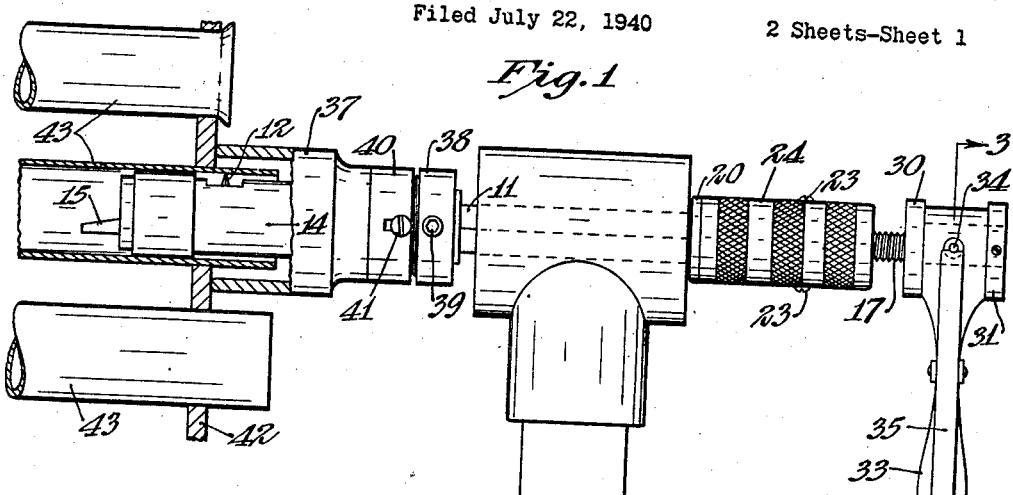
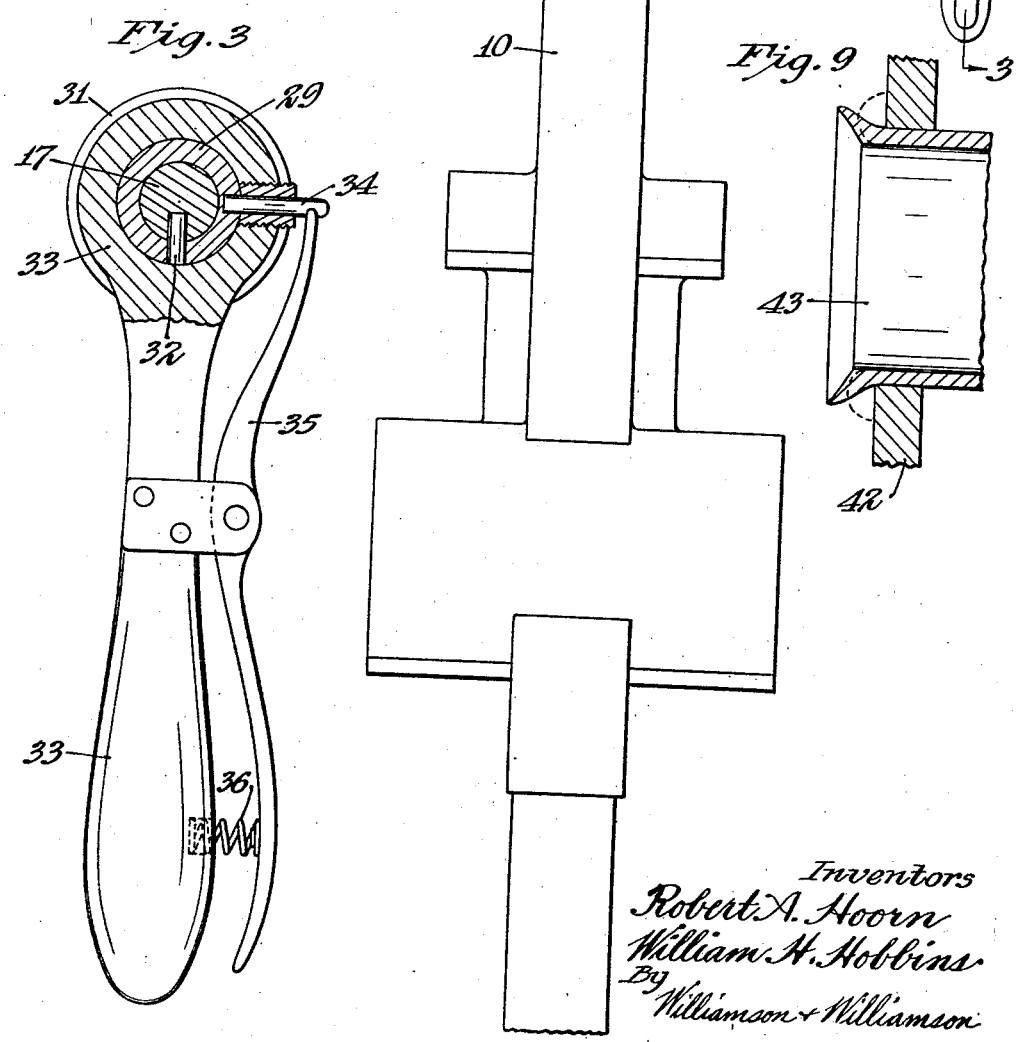
Inventors
Robert A. Hoorn
William H. Hobbins
By Williamson + Williamson
Attorneys

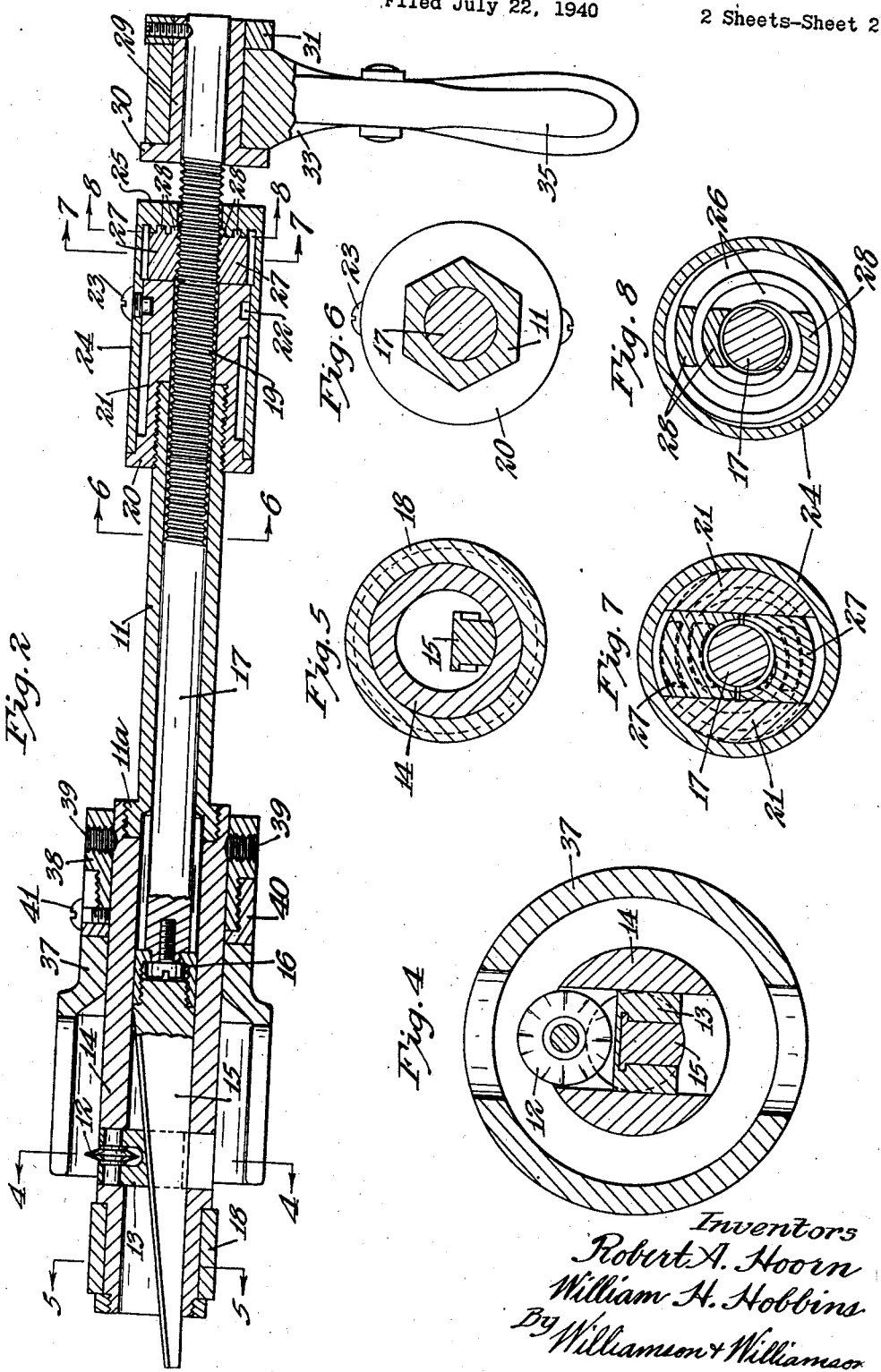

Patented Sept. 15, 1942

2,295,789

UNITED STATES PATENT OFFICE 2,295,789

FLUE CUTTING TOOL

Robert A. Hoorn, Minneapolis, Minn., and William H. Hobbins, Glendive, Mont.

Application July 22, 1940, Serial No. 346,882

2 Claims. (Cl. 30—107)

This invention relates to flue cutters and the like and is particularly adaptable for use in connection with internal cutters although features thereof may be applied to external flue cutters.

It is an object of our invention to provide a flue cutter which is mechanically operated and which has in connection therewith cutter feed means for progressively deepening the cut, said feed means being operable synchronously with the cutter operating means.

It is another object of our invention to provide a mechanically operated flue cutter with a cutter feed synchronously operable therewith in combination with means for disconnecting the cutter drive from the feed means at will.

It is a further object of our invention to provide cutter drive means and cutter feed means wherein one is concentric to the other and a synchronous drive connection is made between the two, said drive connection being so arranged that the cutter feed means can be quickly and easily restored from its extreme cutter feed position to a position ready for a succeeding cut.

A further object of our invention is to provide a cutter gauge which will operate in combination with the boiler plate and which is adjustable relative to the cutter to permit cutting of the flues at any desired distance from the outer face of the plate.

These and other objects and advantages of the invention will more fully appear from the following description made in connection with the accompanying drawings, wherein like reference characters refer to the same parts throughout the views, and, in which:

Fig. 1 is a plan view of our invention with fragments of boiler flues shown in connection therewith to show the mode of mounting and use;

Fig. 2 is a longitudinal section through the cutting apparatus;

Fig. 3 is an enlarged section taken on the line 3—3 of Fig. 1;

Fig. 4 is an enlarged section taken on the line 4—4 of Fig. 2;

Fig. 5 is an enlarged section taken on the line 5—5 of Fig. 2;

Fig. 6 is an enlarged section taken on the line 6—6 of Fig. 2;

Fig. 7 is an enlarged section taken on the line 7—7 of Fig. 2;

Fig. 8 is an enlarged section taken on the line 8—8 of Fig. 2; and

Fig. 9 is a fragmentary section through the end of a boiler flue and through a portion of a boiler plate.

In Fig. 1 of the drawings there is shown a rotary drive air motor 10. This motor is not shown in detail since its particular structure has no bearing on the present invention. A power unt, such as an Ingersoll-Rand pneumatic wrench, is adaptable for the purposes of our invention. The wrench is adapted to be connected to the intermediate portion of a hexagonal cutter supporting shank 11 to drive the cutter as will be seen below.

The cutter per se comprises a rotary blade 12 which is supported by a block 13, the latter being radially slidable adjacent the left-hand end of a tubular element 14 which is connected in turn to the left-hand end of the shank 11 by a right-hand threaded connection 11a as the shank 11 is to be driven in a counterclockwise direction when viewed from the left-hand end of the apparatus. The cutter carrying block 13 has an inclined guideway formed therein to slidably receive the wedge-like cutter feed element 15. If the element 15 is moved longitudinally in the sleeve 14, it will in turn move the cutter inwardly or outwardly with respect to said sleeve 14. The rear or right-hand end of the wedge-shaped cutter feed element 15 is swivelly connected at 16 to one end of a bar 17 which lies within and is slidable with respect to the tubular shank 11. The left-hand end of sleeve 14 carries an antifriction sleeve 18 which is adapted to fit within a flue and serve as a support for the left-hand or inner end of the cutter apparatus.

The right-hand end of the cutter feed bar 17 is threaded as at 19 and it extends outwardly beyond the end of the tubular shank 11 for a considerable distance. As shown best in Fig. 2, the extreme outer end of the bar 17 is peripherally smooth. The right-hand end of the tubular shank 11 is provided with left-hand threads, and upon this threaded portion is mounted a collar 20. Counterclockwise rotation of the shank and frictional drag on the collar will cause said collar to remain in a tightly locked position on the tubular shank. The collar 20 has a sleeve-like portion 21 extending therefrom and at the right-hand end of the sleeve is a circular guideway 22 which is adapted to receive the end of a short stud 23 which in turn is anchored in a sleeve 24 outwardly concentric to the sleeve 21 which is secured to the collar 20. The right-hand end of the outer sleeve 24 is closed by an apertured disc-like portion 25, and on the inner face of the element 25 we provide a spiral guideway 26, as best shown in Fig. 8. It will also be seen that the disc-like element 25 which closes the end of the sleeve 24 is apertured to receive the threaded portion 19 of the cutter feed bar 17. Mounted in the right-hand end of sleeve 21 are dogs 27 which have arcuate teeth 28 which are adapted to slidably fit in the spiral grooves formed by the spiral guideway 26. The inner portions of the dogs 27 which lie next to the threads 19 on the cutter feed bar 17 are threaded to fit the threads on said cutter feed bar, but it will be seen that when the sleeve 24 with its end 25 is rotated in one direction it will bring the threads on the dogs 27 into engagement with the threads 19 on the cutter feed bar, and when the sleeve 24 is rotated in an opposite direction the dogs 27 will be retracted outwardly to bring their threads out of engagement with the threads on the cutter feed bar. It might be noted at this point that said threads 19 are left-hand threads and with the tubular shank 11 rotated in a counterclockwise direction, as stated above, and when the cutter feed bar is held against rotation said bar will be fed gradually toward the left through the tubular shank 11 if the threaded dogs 27 are in engagement with the threads 19. It should also be noted that the dogs 27 are mounted for reciprocal movement in the right-hand end of the sleeve-like element 21 which is adapted to rotate at all times with the tubular shank 11.

On the extreme outer or right-hand end of the cutter feed bar 17 is a bearing comprising a sleeve 29 and flanges 30 and 31. Sleeve 29 is secured to the cutter guide bar 17 by a pin 32, shown best in Fig. 3. Mounted for rotation on the bearing sleeve 29 is a handle 33 whose hub carries a radially slidable locking pin 34. The position of this pin is determined by a lever 35 which is pivoted to the handle, as best shown in Fig. 3, and a spring 36 beneath the free end of the lever 35 normally urges the locking pin 34 inwardly toward the bearing sleeve 29. It will be seen in Fig. 3 that the bearing sleeve has a detent in which the locking pin 34 can seat, thus locking the handle 33 against movement relative to the cutter feed bar 17.

Slidably mounted on the tubular element 14 which carries the cutter 12 and its cutter block 13 is a substantially tubular cutter gauge element 37. A collar 38 has a portion secured by set screws 39 to the tubular cutter support 14, and said collar 38 has a threaded portion to receive a collar 40 which has a smooth left-hand face which slidably abuts the right-hand end of the gauge sleeve 37. The collar 40 can be moved to the left of the position shown in Fig. 2 by rotating it at its threaded connection with the threaded collar 38 and it can be retained in any desired position by a set-screw 41 which firmly ties the two threaded collars together.

In operation the apparatus is mounted on the end of a boiler flue by inserting the free end of the tubular cutter support 14 into a boiler flue, the tubular cutter gauge 37 contacting the outer face of the boiler plate and said gauge having been set by adjustment with the collar 40 with respect to the collar 38 so that the cutter 12 can be inserted in the flue the distance required. The cutter feed bar handle 33 is connected with the feed bar by releasing the spring pressed lever 35 to bring about engagement of the locking pin 34 with the sleeve 29 which is keyed to the cutter feed bar. The dogs 27 are brought into engagement with the threads 19 on the cutter feed bar by rotation of the sleeve 24 with its spiral track 26 on the sleeve end 25 and the pneumatic motor 10 is put into operation. The tubular cutter driving shank 11 will then be rotated and the cutter feed bar handle 33 is held firmly to prevent the feed bar from rotating with said shank 11. This will gradually move the cutter feed bar toward the left and the wedge-like feed element 15 on the left-hand end of the feed bar will cause the cutter block 13 and cutter 12 to be moved slowly outwardly into cutting engagement with the inner wall of the flue. Since the cutter gauge 37 is freely rotatable on the cutter supporting sleeve 14, said gauge will remain stationary in contact with the boiler plate. Should the outward feeding of the cutter 12 progress more rapidly than desired it is possible to temporarily halt the feeding operation by pressing the free end of the lever 35 on the feed bar handle 33, thus disengaging said handle from the cutter feed bar. The feed bar will then rotate with the shank 11 to which the motor is connected due to frictional resistance and the cutter 12 will be rotated in its path of cut as long as desired without further feeding of said cutter. The feed can be resumed by releasing the spring pressed lever 35 on the cutter feed bar handle 33 and as soon as the handle and bar are locked together, rotation of said bar will be stopped and it will again begin to feed toward the left through the motor rotated shank 11.

In Fig. 9 there is shown a section of boiler plate 42 through which extends a flue end 43. It will be seen that the end of the flue is flared outwardly and this is the shape produced by the cutter end after a cut is completed. It is then a relatively simple matter to turn over the flared end of the flue to the dotted line position shown and the job is complete.

It will, of course, be understood that various changes may be made in the form, details, arrangement and proportions of the various parts without departing from the scope of our invention.

What is claimed is:

1. Flue cutting apparatus comprising, a cutter unit, a rotary support for said cutter unit including a tubular shank extending outwardly from said unit, said shank having a portion constituting a motor connection, said cutter being movable substantially radially of said shank, cutter feed means including a cutter feed bar extending through said shank and having a wedge-like member at one end engaging said cutter unit, the opposite end of said feed bar extending beyond the end of said shank and having threads thereon, a sleeve mounted on an end of said shank and lying in concentric spaced relation to the threaded end of said feed bar, said sleeve having an end wall with an aperture through which the end of said feed bar is slidable, a dog slidably positioned within said sleeve and movable radially between the inner wall of said sleeve and the threaded portion of said feed bar, said dog having threaded portions engageable with the threaded portion of said feed bar, an end face of said dog having a thread formed thereon, a thread on the inner face of said sleeve end wall and in engagement with the threaded end face of said dog, rotational movement of said sleeve relative to said shank causing said dog to move into and out of engagement with the threaded portion of said feed bar, and said dog being rotatable with said shank to provide longitudinal movement of said feed bar relative to said shank when said dog and threaded feed bar portion are in engagement.

2. The structure in claim 1 and means on said feed bar adapted for manual engagement to stop rotational movement thereof.

ROBERT A. HOORN.
WILLIAM H. HOBBINS.